United States Patent [19]

Bonney

[11] 3,774,634
[45] Nov. 27, 1973

[54] ROTARY SPOOL VALVE

[76] Inventor: Roland E. Bonney, Western Ave., Kennebunkport, Maine

[22] Filed: Mar. 1, 1972

[21] Appl. No.: 230,893

[52] U.S. Cl............. 137/596, 137/625.23, 251/283
[51] Int. Cl........................................... F16k 11/00
[58] Field of Search..................... 137/596, 625.23, 137/625.24; 251/283

[56] References Cited
UNITED STATES PATENTS

| 2,312,941 | 3/1943 | Tucker............................ 251/283 X |
| 2,749,941 | 6/1956 | Gardner.......................... 251/283 X |
| 2,880,756 | 4/1959 | Puls................................ 251/283 X |
| 3,015,344 | 1/1962 | Hausmann et al............. 137/625.23 |
| 3,199,539 | 8/1965 | Leathem........................ 137/625.24 |

Primary Examiner—Henry T. Klinksiek
Assistant Examiner—Robert J. Miller
Attorney—Lee A. Strimbeck

[57] ABSTRACT

A four-way valve, particularly useful for controlling the flow of fluid to and from a double-acting hydraulic cylinder, comprises a valve body bored to receive a spool rotatable therein. The valve body has an inlet port and two, right and left, operating ports facing into the side of the bore. The spool has longitudinal slots in its periphery, one inlet set of three slots for admitting fluid to and one discharge set of two or three slots, depending on whether the valve is a closed or open center design, for discharging fluid from the ports, which are made to register with the inlet and operating ports by rotating the spool to the right or left from a mid- or bypass position.

The three inlet slots are interconnected in a pressure-balanced Y-relationship so that displacing forces created by the pressure of the fluid in each slot is balanced.

The discharge slots are connected to a common conduit leading to a discharge port at the end of the valve body.

11 Claims, 18 Drawing Figures

PATENTED NOV 27 1973
3,774,634
SHEET 1 OF 2
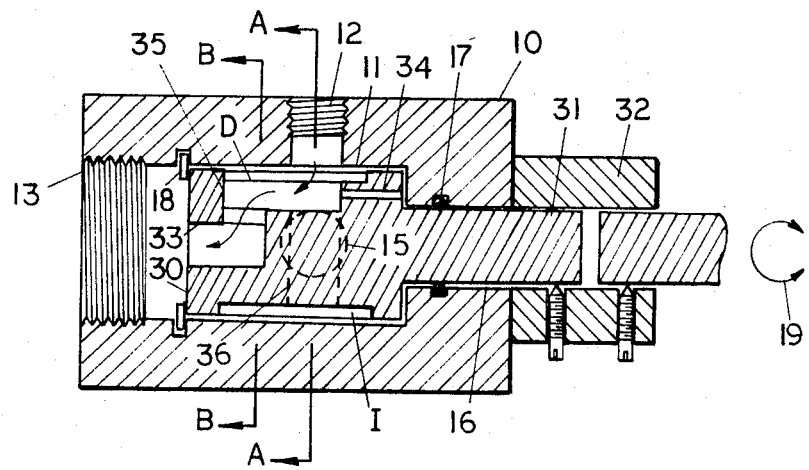
FIG. 1
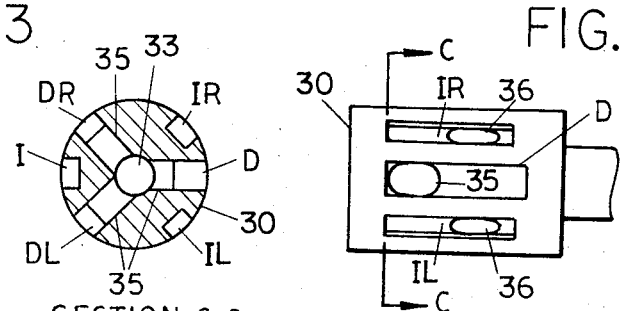
FIG. 3      FIG. 2
SECTION C-C
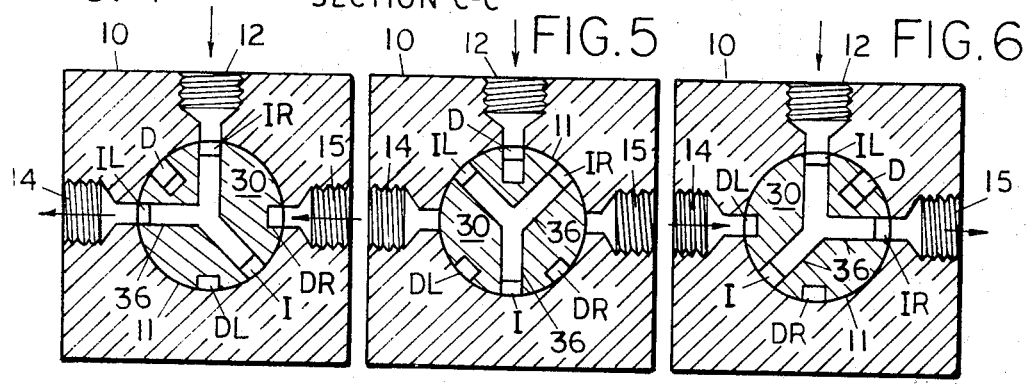
FIG. 4  FIG. 5  FIG. 6
POSITION-L   BY-PASS POSITION   POSITION-R
(SECTION A-A)
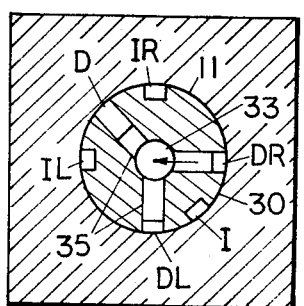 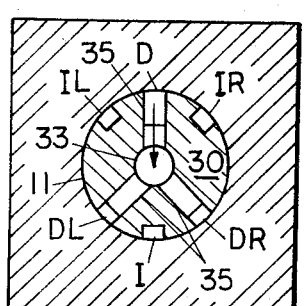 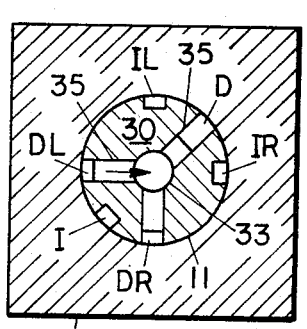
FIG. 7   FIG. 8   FIG. 9 (SECTION B-B)

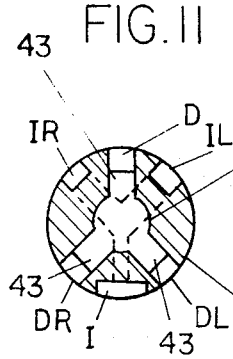
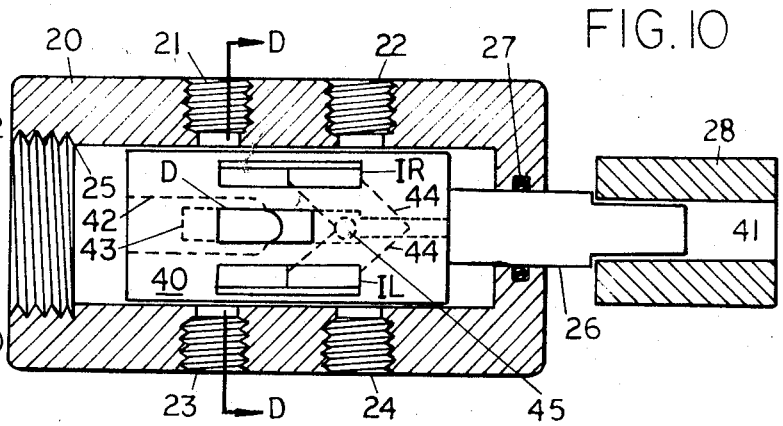
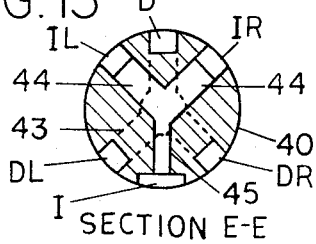
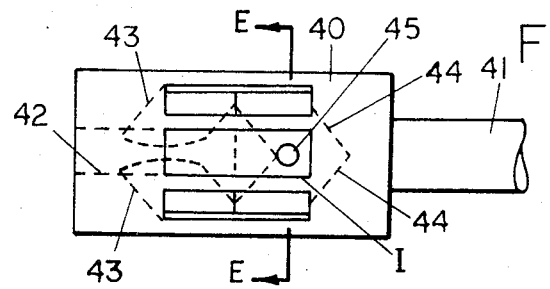
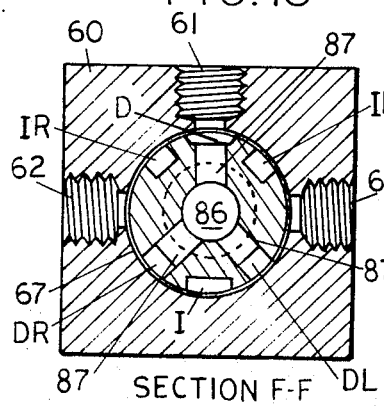
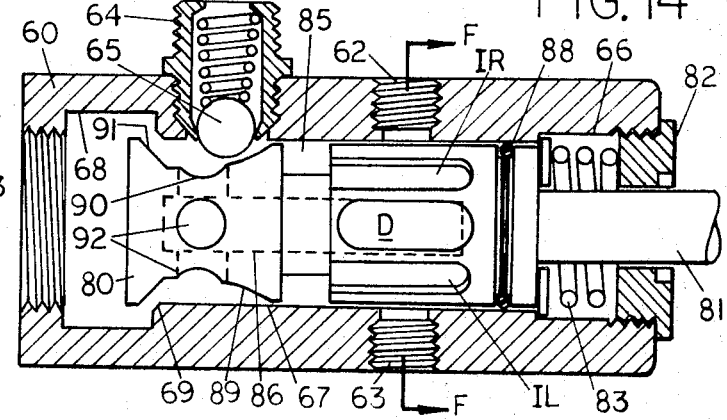
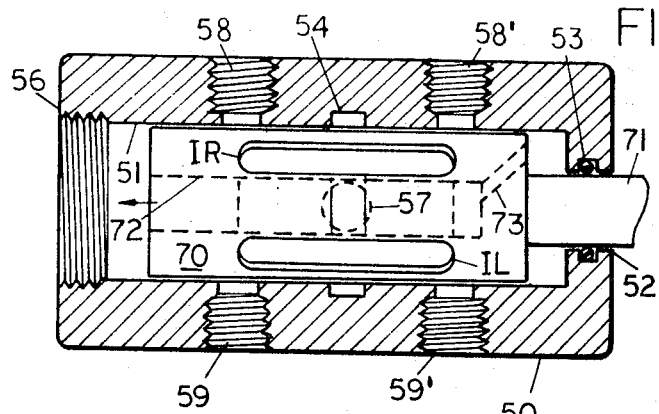
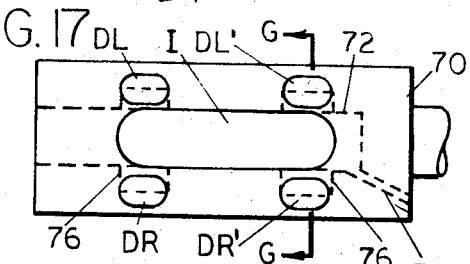
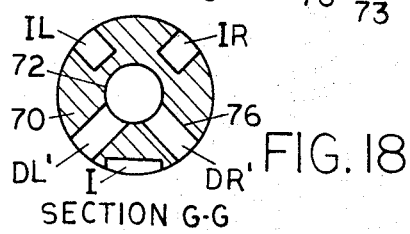

ROTARY SPOOL VALVE

RELATED APPLICATION

This application discloses and claims in combination with the present rotary spool valve a sliding spool valve disclosed in copending application, "Rotary Spool Valve," Ser. No. 230,894, filed on even date herewith by the present inventor.

PRIOR ART

U.S. Pat. Nos. 1,708,273 (Larsen) and 1,269,253 (Brown), FIG. 5, item 34, show valve spools with passageways interconnected in a Y configuration but in neither of these patents does one leg passageway serve the sole function of effecting a pressure balance without passage of fluid therethrough at anytime, nor does either patent show any appreciation of the fact that, in order to achieve a pressure balance, the area of the pressure balance port exposed to the valve body wall must bear a certain relationship to the similar combined areas of the other two ports. Neither valve appears to be useful as a high pressure hydraulic valve.

Reference is also made to: *Industrial Hydraulics Manual*, U.S. Pat. No. 935100, issued 1965 by Vickers Machinery Hydraulics Division, Sperrry Rand Corporation, Troy, Mich. 48084, for terminology and a compreshensive description of prior devices. See especially Chapter 24.

THIS INVENTION

This invention is a rotary spool four-way hydraulic valve, i.e., it has two operating lines to each of which operating fluid can be admitted or discharged as desired.

The valve is of quite simple construction and has only two main operating parts, a valve body and a rotary spool within a cylindrical bore within the valve body and rotatable to one of three operating positions — right feed, bypass, or left feed by suitable means for positioning the spool. The spool can also be slidable along its axis of rotation to other operating positions which permits a ganged valve design using but a single spool, valve body and usually but a single hydraulic fluid inlet port, although two or more can be used if need be, such as an eight or 12-way valve, and/or the valve to be combined with a sliding spool valve to form a six, 10, etc. -way valve.

The spool has two sets, an inlet set and a discharge set, of usually three peripheral longitudinal slots or ports each, disposed to register with an inlet port, two operating ports and a discharge port which, preferably, is at the end of the cylindrical bore in the valve body. Each set of slots, when viewed in a cross section of the spool, are set in the periphery of the spool such that radial lines through the center portion thereof interset to form a Y configuration with the arms thereof being 90° apart and with the leg bisecting the outside angle between the two. The two sets of slots are disposed 180° one to the other.

The discharge set of slots are commonly interconnected by a passageway leading to the discharge port.

The inlet set of slots are interconnected by a common interior or exterior passageway in or about the spool such that the fluid pressure exerted in one is also experienced by the other.

The leg slot of the inlet set does not, in operation, register with any of the ports in the valve body and has the sole function of counterbalancing the displacing forces on the spool caused by the other two inlet ports when they are in their operating positions. The surface area of the leg slot opposed to the wall of the cylindrical bore is proportioned with respect to the angular disposition of the other two slots and their like areas of contact such that the displacing forces created by each are balanced, e.g., when the two slots on the arms of the Y are 90° apart, the open surface area of the leg slot is two-thirds of the combined area of the two. In this way, binding of the spool is avoided and the spool remains quite easy to rotate regardless of the hydraulic pressure.

When the spool is placed in the 0° bypass condition, the middle or leg slot of the discharge set of slots registers with the hydraulic fluid inlet port in the valve body and bypasses the incoming fluid to the discharge port. The remainder of the inlet and discharge slots do not register with any ports in the valve body.

When the spool is placed in the 45°-right operating position, one arm slot of the inlet set registers with the inlet port and the other arm slot registers with one, the right, of the operating ports in the valve body, directing the incoming fluid therethrough, and one arm slot of the discharge set registers with the other, the left, operating port permitting fluid to drain therefrom to the discharge port.

When the position of the spool is reversed to the 45°-left operating position, the other inlet arm slot registers with the left operating port while the other discharge arm slot registers with the right operating port to permit drainage.

The spool does not have to fit tightly within the bore and any leakage that occurs does not noticeably effect the operation of the valve. Because the high pressures the valve sees are at its center, any leakage goes to return, i.e., the discharge port, rather than out of the valve or system.

As will be appreciated, the valve is smaller, more compact, and easier to locate and operate than any other valve and ganged arrangements thereof used to accomplish the same purpose.

Perhaps one of its most important advantages is that it can be combined with valves requiring a linear action, especially a sliding spool valve. The combination of a rotary spool and sliding spool valve, in accordance with this invention, is particularly useful to control the action of a snowplow blade where usually one single-acting hydraulic cylinder is used to effect raising and lowering of the blade, and two single-acting hydraulic cylinders, one on either side, are used to set the angle of the blade.

Besides being used to control hydraulic cylinders, the present valve is admirably suited to the control of reversible hydraulic motors.

THE DRAWINGS

FIG. 1 is a longitudinal cross-sectional view of the rotary spool valve of this invention, shown in its bypass position;

FIG. 2 is a top view, i.e., rotated 90° from its position in FIG. 1, of the valve spool used in FIG. 1 and FIG. 3 is an end sectional view thereof taken along lines C — C and so designated;

FIGS. 4 – 6 are cross-sectional views of the valve taken along the line A — A of FIG. 1, and showing three different operating positions of the valve;

FIGS. 7 – 9 are similar views taken along line B —B of FIG. 1;

FIG. 10 is a top view of another form of spool for an eight-way valve, with the valve body thereof being shown in half section about the spool, and FIG. 11 is a cross-sectional view of the spool of FIG. 10 taken along line D — D and so designated;

FIG. 12 is a bottom view of the spool of FIG. 10, and

FIG. 11 is a cross-sectional view thereof taken along line E — E of FIG. 12 and so designated;

FIG. 14 is a top view of a spool for ganged six-way open center rotary and sliding spool valve with the valve body being shown in horizontal half section thereabout, and FIG. 15 is a full cross section of the valve taken along line F — F and so designated;

FIG. 16 is a similar horizontal cross section of an eight-way closed center rotary spool valve body, showing a top view of the spool in place; and in FIGS. 1– 9, since the same parts are depicted, common reference numerals have been used. The same is true of FIGS. 10 – 13.

The spool design of this invention as illustrated has, in all cases, two sets, an inlet and a discharge set, of longitudinal slots in the periphery of the spool. These have been given common consistent code designations in all of the drawings.

There are always three slots in the set of inlet slots. For open center designs, there are three slots in the discharge set, and for a closed center design, there are only two slots in the discharge set.

Each set of slots, when viewed in a cross section of the spool, are offset around the periphery in such a manner that radial center lines therethrough intersect to form a "Y", i.e., the three slots are arranged in a "Y" configuration, and, for convenience, the slots at the end of the "arms" of the "Y" are referred to as arm-slots, and that at the end of the "leg" of the "Y" as the leg-slots.

DESCRIPTION

Referring to FIGS. 1–9, the valve comprises a valve body 10, bored to have a cyindrical valve chamber 11, a fluid inlet port 12, a discharge port 13 and two operating ports 14 and 15, opposed 180° on the periphery of the bore as illustrated. The inlet and operating ports, as can be seen, face into the bore 11 through its cylindrical wall.

The valve body 10 is also bored at 16 to permit a valve stem to extend through and to retain an O-ring seal 17.

A spool 30 mates and fits within bore 11 with a reasonably close tolerance. As illustrated, the spool 30 has an integral valve stem 31 extending through bore 16 although the valve stem 31 can be detachably mounted if desired. While not operationally necessary because there are no longitudinal displacing forces acting on the spool, the spool can be retained by a snap-in ring 18. Alternatively, coupling 32 can be placed on stem 31 to hold the assembly together, which coupling for attaching the stem to a control shaft can have stops on it to arrest the rotation of the spool at the desired right and left 45° points and a spring return to the 0° position. The spool rotates freely in the valve body as indicated by the direction arrow 19.

Spool 30 is centrally bored at 33 to provide a discharge passageway.

Six longitudinal slots facing bore 11 are cut into the periphery of spool 30 which, for the illustrated embodiment, do not extend to the edges of the spool. The slots are arranged into two sets of three each, a discharge set designated D, DL and DR ("L" for left, "R" for right) respectively, and an inlet set designated I, IL and IR respectively.

Each of the three discharge slots are connected by passageways 35 to the central discharge conduit 33. Each of three inlet conduits are commonly connected by passageways 36. While the conduit leading to the pressure balancing slot I can have a quite small cross-sectional area, the other 5 passageways are preferably made as large as possible to avoid undue restriction of fluid flow and needlessly working of the hydraulic pump. Preferably, the cross-sectional areas of each of the passageways through which high pressure fluid flows approximately equals the cross-sectional area of the feed line to avoid undue pressure drop and working of the pump. For this reason, the D passageway is cut in this design deeper into the spool to permit ready bypass flow.

The three discharge slots, D, DL and DR, rather than being connected to passageway 33 by passageway 35, can simply extend to the end of the spool and discharge directly in port 13 with passageways 33 and 35 being eliminated. A small bore 34 can be used to relieve pressure from behind the spool.

Passageways 35 and 36 connect the slots into a "Y." The arm-slots of the discharge "Y" and DL and DR, of the inlet "Y", IL and IR. The leg-slot of the discharge "Y" is D, and of the inlet, "Y," I. The sole function of the discharge leg-slot D is to bypass fluid when the valve is in the bypass position, and the sole function of the inlet leg-slot is to act as a pressure balance against the force created by the inlet arm-slots when they are in register with the operating ports.

The arm-slots are angularly displaced one from another 90°, and the leg-slot bisects the outside angle therebetween. In order to create a pressure balance, the area of the inlet leg-slot I facing bore 11 should be two-thirds of the combined areas of the inlet arm-slots IL and IR. This area is usually obtained by lengthening the slot with respect to the length of the other two slots.

While the use of slots is preferred, the inlet ports I, IL and IR can be circular in configuration for registering with the ports in the valve body in some applications, so long as the area of the pressure balancing port I is two-thirds the combined areas of the IL and IR ports. Also, while the passageways connecting the slots will usually be connected in a Y configuration, in cross section the same effect can be achieved by internal passageways arranged in a delta configuration, which leaves the center of the spool free for a central bore.

It will be noted that the leg-slots of each set are disposed 180° one from the other.

The operation of the valve of FIGS. 1–9 is as follows. In the bypass position, hydraulic fluid enters port 12, flows through slot D, passageway 35 and 33 and out of discharge port 13 to be returned to the storage tank for the hydraulic pump. None of the other five slots are in register with either of the operating ports 14 and 15.

Assuming that one operating port is connected to one side of a hydraulic cylinder and the other operating port to the other side, then, when spool 30 is rotated to the left position (position-L), hydraulic fluid is directed from the inlet port 12 via via slot IR, conduits 36 and slot IL through port 14 to one end of the cylinder, while pressure is relieved from the other end of the cylinder by fluid being permitted to be discharged through port 15, slot DR, conduits 35 and 33 through discharge port 13 to the storage tank. The pressure balancing slot I sees the same pressures as slots IL and IR, and, thus considering the proportional area of slot I, spool 30 is pressure balanced in bore 11 and can be rotated easily.

To reverse the action of the hydraulic cylinder, spool 30 is rotated to position-R. Fluid then passes from port 12, slot IL, conduit 36, slot IR and port 15 to the other end of the cylinder, while pressure is relieved on the other side of the piston of the cylinder by fluid flowing into port 14, moving laterally through slot DL, thence through conduits 35 and 33 and discharge port 13.

Whether or not the discharge ends of the discharge slots extend to the discharge end of the spool, it is in many applications desirable for them to extend to the end wall of the spool facing the valve stem. Fluid can then flow from one to the other of the discharge conduits over the face of the end wall creating a fluid film between it and the valve body and, since passing through only one of the conduits 35 may unduly restrict flow, increasing the cross-sectional area for discharge flow and reducing the work of the hydraulic pump when the valve is in the bypass position.

Referring to FIGS. 10 – 13, an 8-way rotary spool valve consists of a valve body 20 tapped to have an inlet port on top (not shown) and 90° to either side thereof and longitudinally spaced on either side thereof, two sets of opposed takeoff ports 21, 22, 23 and 24. One end of body 20 is open at 25 to provide a discharge port and the other end is bored at 26 to receive a valve stem and an O-ring seal 27.

The spool 40 has a valve stem 41 extending through the valve body to a coupling 28. The periphery is longitudinally slotted as shown with slots D, DL, DR, I, IR and IL. A central passageway 42 is provided which stops short of the mid point of the spool, as shown in shadow outline. Slots D, DL and DR are connected thereto by passageway slots 43 angled downward toward the exit end of the spool, shown in shadow outline on the plane views in FIGS. 5 and 6. Similar slots IR and IR are connected by passageway slots 44 angled downward toward the rear of the spool. Slots 43 and 44 are as wide as the design permits to provide as much cross-sectional area for and as little impediment to flow as possible. However, because the passageway 45 connecting the pressure balancing slot I with the juncture of passageways 44 does not have to provide for the flowthrough of fluid, it can be quite small, if desired, e.g., a small drilled hole.

It can be seen that two operate ports 21 and 23, spool 40 is slid to the left as illustrated and rotated 45° to one position or the other, which leaves ports 22 and 24 inactive. To operate ports 22 and 24 it is slid to the right from its mid position and similarly rotated. In the spools mid 0° position, hydraulic fluid is bypassed through slot D, passageway 43 and 42 and out of port 25.

FIGS. 14–15 illustrates a combined sliding and rotary spool valve particularly useful for controlling the action of a snowplow blade. A valve body 60 is tapped to have an inlet conduit 61 on top (not shown in the plan view) and 90° on either side thereof in the same cross-sectional plane two opposed operating ports 62 and 63. On line with but longitudinally spaced from port 62 is a take-off line 64 having a spring loaded normally closed ball check valve 65 in the end thereof, the ball of which protrudes slightly into the valve chamber.

Valve body 60 is boreed at 66 to provide for a valve stem and returning plug, has a smaller bore at 67 to accommodate a valve spool and has a slightly larger bore at 68 serving as a discharge port and providing a rim 69 which serves as a valve seat.

Spool 80 has a valve stem 81 extending through a retaining plug 82 which holds a spring 83 acting against the spool, but only when the spool is retracted.

The rotary spool portion of the valve is slotted as before with slots I, IR, IL, D, DR and DL. However, instead of using interior passageways to connect slots I, IR and ID, they are connected by a circumferential groove 85 about the spool. The spool has a central bore 86, plugged at the discharge end, shown in shadow outline. In some designs, passageway 86 can extend to the face of the spool for direct discharge into discharge port 68. Slots D, DL and DR are connected to bore 86 by passageway 87.

The rear end of the spool is sealed by an O-ring 88. Connecting groove 85 could as well be in the position of O-ring 88, and the O-ring could be placed in the retaining plug 82.

For the sliding spool portion of the valve, the spool is reduced in diameter to provide a sloping shoulder 89 adapted to engage the ball of the check valve, a portion 90 of small diameter to clear the check valve ball, and a lip 91 adapted to seat in and form a seal with rim 69. Four passageways 92 connect with bore 86 and provide for passage of fluid to the discharge port 68.

When the valve of FIGS. 14–15 is in its mid 0° position, as illustrated, hydraulic fluid is admitted by port 61 to slot D and flows through passageways 87, 86 and 92 to discharge port 68. Check valve 65 remains closed so that no fluid can flow from take-off line 64.

When spool 80 is kept in the mid position and rotated 45° to the right, fluid flows from port 61 to slot IL, thence through groove 85 to slot IR and out through port 62. Fluid flows from port 63 through slot DL, passageway 87, bore 86 and passageway 92 to discharge port 68. Reversing the spool to the 45°-left position reverses the flow of fluid. The sliding portion spool of the valve remains inoperative.

When the spool is maintained in the 0° position and pushed forward, shoulder 89 engages the ball of the check valve 65, opening it and permitting fluid to drain from take-off 64. Since spring 83 does not act on the spool, the spool can be left in this position, keeping the check valve open so that the load on the take-off line can "float," which may be desired if the take-off line 64 were being used to raise and lower a snowplow blade and one wished to leave the blade in the lowered position to follow the contours of the road.

With the spool in the 0° position and spool 80 retracted, lip 91 seats in rim 69, shutting off discharge of the fluid which is being admitted to the sliding spool portion of the valve via port 61, slot D and passageways 87, 86 and 92. Thus, the ball of the check valve is exposed to the full pressure of the hydraulic fluid, the ball of the valve lifts and the hydraulic fluid enters take-off line 64. In this design, when the spool is in this closed position, the discharge slots D, DR and DL see the full pressure of the hydraulic fluid and, therefore, it is necessary to widen the top of the D slot, as shown in Section F – F, so its area is two-thirds the areas of slots DR and DL and it counterbalances the displacing forces from slots DR and DL.

In some applications, seat 69 can be dispensed with and lip 91 can be reduced in diameter to slide within bore 67 and form seal against the face of the bore. While there may be some leakage, it is not troublesome.

Turning to FIGS. 16 – 18 the eight-way rotating spool valve consists of a valve body 50 bored at 51 to receive spool 70. A smaller bore 52 is provided for the valve stem 71 and is recessed to contain an O-ring seal 53. Bore 54 terminates in a discharge port 56. A top inlet port is provided at 57 (shown in shadow outline) and two pairs of opposed operating ports, 58, 58', 59 and 59' disposed 90° on either side of port 57. Each pair of operating ports is connected to either end of a hydraulic cylinder.

The spool 70 is rotatable in bore 51, and is longitudinally or axially slidable into its various operating positions.

Spool 70 has the usual three longitudinal peripheral slots or channels, I, IR and IL. The arm-slots are disposed 90° apart. These three slots and port 57 are commonly connected by an annular groove 54 turned into bore 51 on the centerline of port 57.

Spool 70 is provided with a central discharge bore 72 communicating with discharge port 56. A small passageway 73 connects the area at the end of the spool with the discharge bore 72. Instead of slots, the spool has two sets of circular ports, DL, DL', DR and DR' adapted to register with ports 58, 58', 59 and 59' when the spool is in a 45° position. Ports DL, DL', DR and DR' are connected to bore 72 by passageways 76, shown in shadow outline in FIG. 17.

In this closed center design, there is no slot corresponding to the "D" slot shown in FIGS. 16 –18. This valve design in its 0° center position does not provide for bypass of the hydraulic fluid supplied to port 57. A pressure accumulator or bypass relief system can be provided at the hydraulic pump.

The valve is made to operate as previously described by rotating spool 70 45° and sliding it forward or back to register slots IR and IL and ports DR and DL and DR' and DL' as desired with either operating ports 58 and 58' or 59 and 59'.

With each of the spool designs illustrated, the center lines of the inlet slots I, IR and IL in cross section always form a Y with the arm-slots being 90° apart and with the leg-slots bisecting the outside angle therebetween. The two discharge slots DR and DL that register with the operating ports are always disposed 45° on either side of the leg-slot of the inlet Y and thus DR is disposed 180° from IL and DL is disposed 180° from IR.

What is claimed is:
1. A four-way valve comprising:
   A. a valve body having a cylindrical valve chamber, a discharge port connecting with one end of said chamber, and facing into said chamber on the cylindrical wall thereof, an inlet port and opposed right and left operating ports, said operating ports being disposed 90° around said wall on each side of said inlet port, and
   B. a cylindrical spool mating with and fitting within said chamber and adapted for rotation therein;
   said spool having an inlet set of three longitudinal slots in the periphery thereof facing said wall and commonly interconnected by a passageway, said slots when viewed in a cross section of said spool being offset in a Y configuration with the arm-slots being 90° apart and the leg-slot bisecting the outside angle of said arm slots, the area of contact afforded by said leg slot with the cylindrical wall of said valve chamber being so proportioned with respect to the areas of contact afforded by the arm-slots that the displacing forces created by each are balanced;
   said spool also having at least two discharge openings in the periphery thereof which discharge openings when viewed in a cross section of said spool are disposed 45° on each side of said leg-slot, said discharge openings being adapted to register with said operating ports and being commonly interconnected and connected with said discharge port by a discharge passageway;
   and said spool fitting into said valve body and said slots and openings being disposed such that when said spool is rotated to be in the
   a. mid position, none of said slots and openings register with any of said ports;
   b. right feed position, one arm-slot of said inlet set registers with said inlet port and the other arm-slot thereof with said right-operating port, and one of said discharge openings registers with said left-operating port; and
   c. left-feed position, the other arm-slot of said inlet set registers with said inlet port and said one arm-slot with said left operating port, and the other of said discharge openings registers with said right-operating port.

2. The valve of claim 1 wherein a cylindrical valve stem extends from one end of said spool along the axis of rotation thereof through said valve body and a seal against fluid leakage is maintained therebetween.

3. The valve of claim 1 wherein there are three of said discharge openings on the periphery of said spool, the center lines of which intersect in a Y configuration and all commonly interconnected by said discharge passageway, the Y of said inlet slots being disposed 180° to the Y of said discharge openings, and the leg opening of said discharge openings when said spool is in said mid position registering with said inlet port and allowing fluid to bypass to said discharge port.

4. The valve of claim 3 when ganged with another of said valves side-by-side along the axis of revolution of said spool, therebeing but a single valve body with but a single common inlet port, discharge port and a single common spool having only said sets of slots and discharge opening and two sets of said operating ports, longitudinally offset one from the other, said spool being longitudinally movable from a mid position in either direction and rotated to effect operation of one or the other of said sets of operating ports.

5. A sliding and rotary spool valve comprising:
   a valve body having a cylindrical bore, a discharge port at one end thereof, and inlet port and a pair of opposed operating ports disposed 90° on either side thereof, all three ports opening into the mid portion of said cylindrical bore, and a take-off port with a check valve therein between said mid portion and said discharge port, said check valve being normally closed to flow into said cyindrical bore, said cylindrical bore having a valve seat between said take-off port and said discharge port;

a spool mating and fitting within said bore and adapted for axial and rotary motion therein, said spool having a straight cylindrical first section in the area of said mid portion and having at the end facing said discharge port a shoulder tapering to a straight cylindrical second section of smaller diameter than the first and ending in a annular lip, said lip being downstream of said valve seat and being adapted to form a discharge valve therewith;

said first section having a bypass passageway adapted to transmit fluid from said inlet port to the area of said second section when said spool is in a closed position and having axially disposed peripheral passageways therein, one side of which opens to said cyindrical bore, arranged in two sets, an inlet set of three passageways and a discharge set of at least two passageways, said inlet set when viewed in a cross section of said spool being arranged in a Y configuration thereabout with the leg passageway registering with said inlet port when said spool is in a 0° mid position, and the arm passageways of said inlet set being 90° apart with the leg passageway bisecting the outside angle therebetween; the ends of said inlet set terminating within said first section and being interconnected by a common passageway, and the area of the leg passageway of said inlet set contacting said cylindrical bore being about two-thirds of the combined areas of the arm passageways so contacting said cyilndrical bore; and two of said discharge passageways being disposed 45° on either side of said leg passageway and freely communicating with said discharge port when said spool is in a position other than its closed position;

said check valve facing said second section when said spool is in its mid axial position and being adapted to being opened by fluid pressure from within the valve and by engagement with said shoulder;

the disposition of said ports and passageways being such that when said valve is operated with at all times said leg passageway of said inlet set not registering with any of said ports, and placed in a 0° rotation position with neither of said operating ports registering with any of said passageways and a. an axial mid position, said discharge port is open and said check valve is closed, b. an axial closed position, said discharge valve is closed, said inlet port introduces fluid into the zone of said second section through said bypass passageway and the pressure thereof causes said check valve to open, and c. axial open position, said discharge port is open and said shoulder engages said check valve, opening the same;

45° rotation in either direction, said check valve remaining closed and said discharge valve remaining open, a leg passageway of said inlet set registers with said inlet port and the other leg passageway registers with one of said operating ports, and one of said discharge passageways registers with the other of said operating ports.

6. The valve of claim 5 wherein said bypass passageway forms a third member of said discharge set and is disposed on the periphery of said spool at a radial angle that bisects the outside angle between the other two passageways of said discharge set, said bypass passageway registering with said inlet port when said spool is in said 0° position.

7. In a rotary spool valve having a flow directing rotary spool mating with and rotatable in a cylindrical valve chamber, said valve chamber having in the cylindrical wall thereof an inlet port and a first and a second operating port radially disposed 45° on either side of said inlet port, and said spool having opposed first and second directing ports facing said cyindrical wall and connected by a common passageway, said first directing port when said spool is in a first operating position registering with said inlet port while said second directing port registers with said second operating port and said second directing port when said spool is rotated to a second operating position registering with said inlet port while said first directing port registers with said first operating port, the improvement comprising:

a pressure balancing port in said spool facing said cylincrical wall and connecting with said common passageway, said pressure balancing port being centrally disposed on the line that bisects the outside angle between said directing ports when viewed in a cross section of said spool, and the surface area of said pressure balancing port contacting said cylindrical wall being so proportioned with respect to the combined similar surface area of said directing ports and the angular disposition thereof that the displacing forces on said spool by fluid confined by said directing and pressure balancing ports are balanced.

8. The valve of claim 7 wherein a portion of each of said ports overlap a common plane perpendicular to the axis of rotation of said spool.

9. The valve of claim 7 wherein said common passageway is composed of three intersecting interior passageways in said spool, one each of which connects to one of said directing and pressure balancing ports.

10. The valve of claim 7 wherein said common passageway is a circumferential groove in the periphery of said spool.

11. The valve of claim 7 wherein said common passageway is a circumferential groove in said cylindrical valve chamber intersecting said inlet port.

* * * * *